US010346927B1

(12) United States Patent
Lunt et al.

(10) Patent No.: US 10,346,927 B1
(45) Date of Patent: Jul. 9, 2019

(54) METHOD AND SYSTEM FOR PROVIDING A PERSONALIZED USER EXPERIENCE IN A TAX RETURN PREPARATION SYSTEM BASED ON PREDICTED LIFE EVENTS FOR A USER

(71) Applicant: Intuit Inc., Mountain View, CA (US)

(72) Inventors: Jonathan Lunt, San Diego, CA (US); Yao H. Morin, San Diego, CA (US); Massimo Mascaro, San Diego, CA (US); Joel R. Minton, Arlington, VA (US); Carol Ann Howe, San Diego, CA (US); Sharon Hunt, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 439 days.

(21) Appl. No.: 15/174,629

(22) Filed: Jun. 6, 2016

(51) Int. Cl.
*G06Q 40/00* (2012.01)
(52) U.S. Cl.
CPC ................... *G06Q 40/123* (2013.12)
(58) Field of Classification Search
CPC .................................................. G06Q 40/123
USPC .......................................................... 705/31
See application file for complete search history.

(56) References Cited

U.S. PATENT DOCUMENTS

| | | | |
|---|---|---|---|
| 6,922,488 | B2 | 7/2005 | Mastrianni et al. |
| 6,973,418 | B1 | 12/2005 | Kirshenbaum |
| 7,788,137 | B1 | 8/2010 | Tifford |
| 7,797,166 | B1 | 9/2010 | Bradley et al. |
| 8,090,794 | B1 | 1/2012 | Kilat et al. |
| 8,099,309 | B1 | 1/2012 | Bober |
| 8,190,499 | B1 | 5/2012 | McVickar |
| 8,407,113 | B1 | 3/2013 | Eftekhari et al. |
| 8,490,018 | B2 | 7/2013 | Carter et al. |
| 8,768,313 | B2 | 7/2014 | Rodriguez |
| 8,806,444 | B1 | 8/2014 | Podgorny et al. |

(Continued)

FOREIGN PATENT DOCUMENTS

WO   WO 2016/039779   3/2016

OTHER PUBLICATIONS

Hoeting et al., "Bayesian Model Averaging," Technical Report 335, Department of Statistics, University of Washington, May 28, 1998, 40 pages.

(Continued)

*Primary Examiner* — Jessica Lemieux
(74) *Attorney, Agent, or Firm* — Hawley Troxell Ennis & Hawley LLP; Philip McKay

(57) ABSTRACT

A method and system provides personalized user experiences to users of a tax return preparation system, at least partially based on likelihoods of occurrence of life events for the users in a tax year, according to one embodiment. The method and system applies the user data to one or more predictive models to determine the likelihood that one or more available life events occurred in a user's life in a tax year, according to one embodiment. The method and system display life event icons that represent the one or more available life events, and the life event icons are ranked, sorted, and/or emphasized, based on the likelihood that the one or more available life events occurred in a user's life, to increase a user's confidence in the tax return preparations system's capability to address the user's life changes while preparing the user's tax return, according to one embodiment.

19 Claims, 6 Drawing Sheets

(56) References Cited

U.S. PATENT DOCUMENTS

| | | |
|---|---|---|
| 8,909,568 B1 | 12/2014 | Mann et al. |
| 9,355,650 B2 | 5/2016 | Dimitriadis et al. |
| 9,378,065 B2 | 6/2016 | Shear et al. |
| 9,444,824 B1 | 9/2016 | Balazs et al. |
| 9,648,171 B1 | 5/2017 | Eftekhari et al. |
| 9,891,792 B1 | 2/2018 | Morin et al. |
| 9,983,859 B2 | 5/2018 | Mascaro et al. |
| 9,990,544 B1 | 6/2018 | Uribe et al. |
| 10,013,721 B1 | 7/2018 | Laaser et al. |
| 10,096,072 B1 * | 10/2018 | Ali ................. G06Q 40/123 |
| 10,176,534 B1 * | 1/2019 | Mascaro ........... G06Q 40/123 |
| 2002/0152457 A1 | 10/2002 | Jahnke |
| 2003/0144868 A1 | 7/2003 | MacIntyre et al. |
| 2006/0143093 A1 | 6/2006 | Brandt et al. |
| 2006/0155632 A1 | 7/2006 | Cherkas et al. |
| 2006/0294084 A1 | 12/2006 | Patel et al. |
| 2008/0071703 A1 | 3/2008 | Evans |
| 2008/0127127 A1 | 5/2008 | Chitgupakar et al. |
| 2008/0147494 A1 | 6/2008 | Larson |
| 2009/0106178 A1 | 4/2009 | Chu |
| 2009/0313086 A1 | 12/2009 | Lee et al. |
| 2011/0264569 A1 | 10/2011 | Houseworth et al. |
| 2011/0288868 A1 | 11/2011 | Lloyd et al. |
| 2012/0109792 A1 | 5/2012 | Eftekhari et al. |
| 2013/0198047 A1 | 8/2013 | Houseworth et al. |
| 2013/0268468 A1 | 10/2013 | Vijayaraghavan et al. |
| 2013/0282539 A1 | 10/2013 | Murray |
| 2014/0067518 A1 | 3/2014 | McGovern |
| 2014/0068600 A1 | 3/2014 | Ashok et al. |
| 2014/0075336 A1 | 3/2014 | Curtis et al. |
| 2014/0122381 A1 | 5/2014 | Nowozin |
| 2014/0201045 A1 | 7/2014 | Pai et al. |
| 2014/0359261 A1 | 12/2014 | Collins et al. |
| 2015/0227962 A1 | 8/2015 | Wical et al. |
| 2016/0012350 A1 | 1/2016 | Narayanan et al. |
| 2016/0098804 A1 * | 4/2016 | Mascaro ............. G06Q 40/123 705/31 |
| 2016/0103667 A1 | 4/2016 | Chen et al. |
| 2016/0180470 A1 | 6/2016 | Mascaro et al. |
| 2016/0217534 A1 | 7/2016 | Goldman et al. |
| 2016/0247239 A1 | 8/2016 | Houseworth et al. |
| 2016/0267397 A1 | 9/2016 | Carlsson |
| 2016/0350870 A1 | 12/2016 | Morin et al. |
| 2017/0090893 A1 | 3/2017 | Aditya et al. |
| 2017/0178199 A1 | 6/2017 | Cessna et al. |
| 2017/0186097 A1 | 6/2017 | Mascaro et al. |
| 2017/0200087 A1 | 7/2017 | Mascaro et al. |
| 2017/0300933 A1 | 10/2017 | Mascaro et al. |
| 2017/0308960 A1 | 10/2017 | Mascaro et al. |
| 2017/0315791 A1 | 11/2017 | Mascaro et al. |

OTHER PUBLICATIONS

Rokach et al., "Top-Down Induction of Decision Trees Classifiers—A Survey," IEEE Transactions on Systems, Man, and Cybernetics—Part C: Applications and Reviews, vol. 35, No. 4, Nov. 2005 pp. 476-487.

Araujo et al., "Ensemble Forecasting of Species Distributions," ScienceDirect Trends in Ecology and Evolution, vol. 22, No. 1, Sep. 29, 2006, pp. 42-47.

Agrawal et al., "Thompson Sampling for Contextual Bandits with Linear Payoffs," Proceedings of the 30$^{th}$ International Conference on Machine Learning, Atlanta, Georgia, USA, JMLR: W&CP vol. 28, 2013. 9 pages.

Irsoy et al., "Budding Trees," 22$^{nd}$ International Conference on Pattern Recognition, 2014, pp. 3582-3587.

* cited by examiner

METHOD AND SYSTEM FOR PROVIDING A PERSONALIZED USER EXPERIENCE IN A TAX RETURN PREPARATION SYSTEM BASED ON PREDICTED LIFE EVENTS FOR A USER

BACKGROUND

Financial software services are diverse and valuable tools, providing services that were either never before available, or were previously available only through interaction with a human professional. For example, a financial software service may provide tax preparation or financial management services. Prior to the advent of financial software services, a user would be required to consult with a tax preparation or financial management professional for services and the user would be limited, and potentially inconvenienced, by the hours during which the professional was available for consultation. Furthermore, the user might be required to travel to the professional's physical location. Beyond the inconveniences of scheduling and travel, the user would also be at the mercy of the professional's education, skill, personality, and varying moods. All of these factors resulted in a user vulnerable to human error and variations in human ability and temperament.

Some financial software systems provide services that human professionals are not capable of providing, and even those financial software systems that provide services that are similar to services that have historically been provided by human professionals offer many benefits, such as: the financial software systems does not have limited working hours, is not geographically limited, and is not subject to human error or variations in human ability or temperament. Although financial software systems represent a potentially flexible, highly accessible, and affordable source of services, they do have significant shortcomings.

For example, traditional financial software systems offering tax return preparation services often present a static, predetermined, and pre-packaged user experience to all users as part of the tax return preparation interview process. This is largely because traditional financial software systems provide user experiences by employing static sets of user experience components, which are typically hard-coded elements of the financial software systems and do not lend themselves to effective or efficient modification, or even re-combination. The static, predetermined, and pre-packaged user experience can easily lead to limitations on user confidence in the abilities of the financial software system.

The problem of users' limited confidence in the abilities of the financial software systems becomes apparent when a user experiences a life event or life change during a tax year. Life events, such as marriage, new dependents, career changes, divorce, and death, can shake a tax filer's confidence in preparing his or her taxes. Because the potential downsides (e.g., owing more taxes, taking more time, etc.) of doing one's own taxes after a life event may feel like they outweigh the potential upsides (e.g., filing the return correctly), users who experience a new life event strongly question their ability to prepare their returns without assistance.

The lack of confidence that users have for financial software systems is only amplified when users receive irrelevant questions, information, or other user experiences. In traditional financial software system, the user experience elements presented to a user are pre-determined based on a generic user model that is, in fact and by design, not accurately representative of any "real world" user. It is therefore not surprising that many users, if not all users, of traditional financial software system find the user experience to be, at best, impersonal. In fact, users of traditional tax preparation financial software systems may find the interview experience unnecessarily frustrating and unpleasant. Clearly, this is not the type of impression that results in happy, loyal, repeat customers.

What is needed is a method and system for providing a personalized user experience in a tax return preparation system based on predicted life events for a user, according to one embodiment.

SUMMARY

The systems and methods of the present disclosure analyze numerous historical records of users of a tax return preparation system, and predict life events of a current user, with limited information, in order to personalize or tailor the current user's experience with the tax return preparation system, according to one embodiment. In particular, the systems and methods of the present disclosure show a user representations of one or more life events that the tax return preparation system has determined are likely to have occurred in the user's life during the previous tax year, according to one embodiment. The tax return preparation system allows the user to confirm that the one or more predicted/likely life events actually occurred for the user in the previous tax year.

Personalizing a user's experience with the tax return preparation system in this manner, even at the very beginning of the user's experience, provides a number of benefits to the user. When a user sees the tax return preparation engine present an icon representing a life event that the user had, the tax return preparation engine immediately instills confidence in the user that the tax return preparation system has the ability to address the particular life event in the user's tax return. By providing simple icons that represent life events of the user, the tax return preparation system enables the user to conveniently, quickly, and confidently provide information that can be used to further personalize the user's experience, according to one embodiment.

A tax return preparation system personalizes a tax return preparation interview for a user by predicting one or more life events of the user and by tailoring the user's experience based on the one or more predicted life events, according to one embodiment. The tax return preparation engine acquires user data about a user from one or more sources (e.g., public records, prior tax returns, the user clickstream, etc.), according to one embodiment. The tax return preparation engine applies the user data to one or more predictive models to determine the likelihood of occurrence of each of a number of available life event options, for the user, according to one embodiment. The tax return preparation system ranks the available life event options based on the likelihood that the life event options occurred for the user in a tax year (e.g., in the prior tax year), according to one embodiment. The tax return preparation system displays life event icons that represent the available life event options to the user, emphasizing those of the available life event options that are more likely to be relevant to the user and deemphasizing those of the available life event options that are less likely to be relevant to the user, according to one embodiment.

The tax return preparation system uses the user's interaction with the life event icons to prepare and deliver personalized user experiences to the user, according to one embodiment. The tax return preparation system gathers user data from the user when the user selects one or more of the displayed life event icons to confirm that the selected life event icons represent life events that occurred for the user in the tax year, according to one embodiment. The tax return preparation system uses the user data from the user to determine how to further personalize the tax return preparation interview, by adjusting one or more user experience options based on the life event icons selected by the user, according to one embodiment. The user experience options include, but are not limited to, which tax topics are presented to the user, the order in which tax topics are presented to the user, which questions are presented to a user, a sequence of tax-related questions that are presented to the user, the frequency and substance of marketing content provided to the user, and the like, according to one embodiment.

These and other embodiments of the tax return preparation system are discussed in further detail below.

By applying analytics models to user data in a tax return preparation system to provide a personalized user experience based on predicted life events for a user, implementation of embodiments of the present disclosure allows for significant improvement to the fields of user experience, electronic tax return preparation, data collection, and data processing, according to one embodiment. As one illustrative example, by skipping or postponing one or more of the tax questions that otherwise extend the tax return preparation interview (without financial gain to the user), embodiments of the present disclosure allows for progressing a user through a tax return preparation session with fewer processing cycles and less communications bandwidth. As another example, when users see that the tax return preparation system has the capability to address life events that occurred in the user's life, the user is more likely to feel comfortable proceeding to prepare their tax return on their own with the assistance of the tax return preparation system. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant user experience options for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by showing the user that the tax return preparation system can handle the life events that are likely to have occurred for the user, the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

Figure 1A:
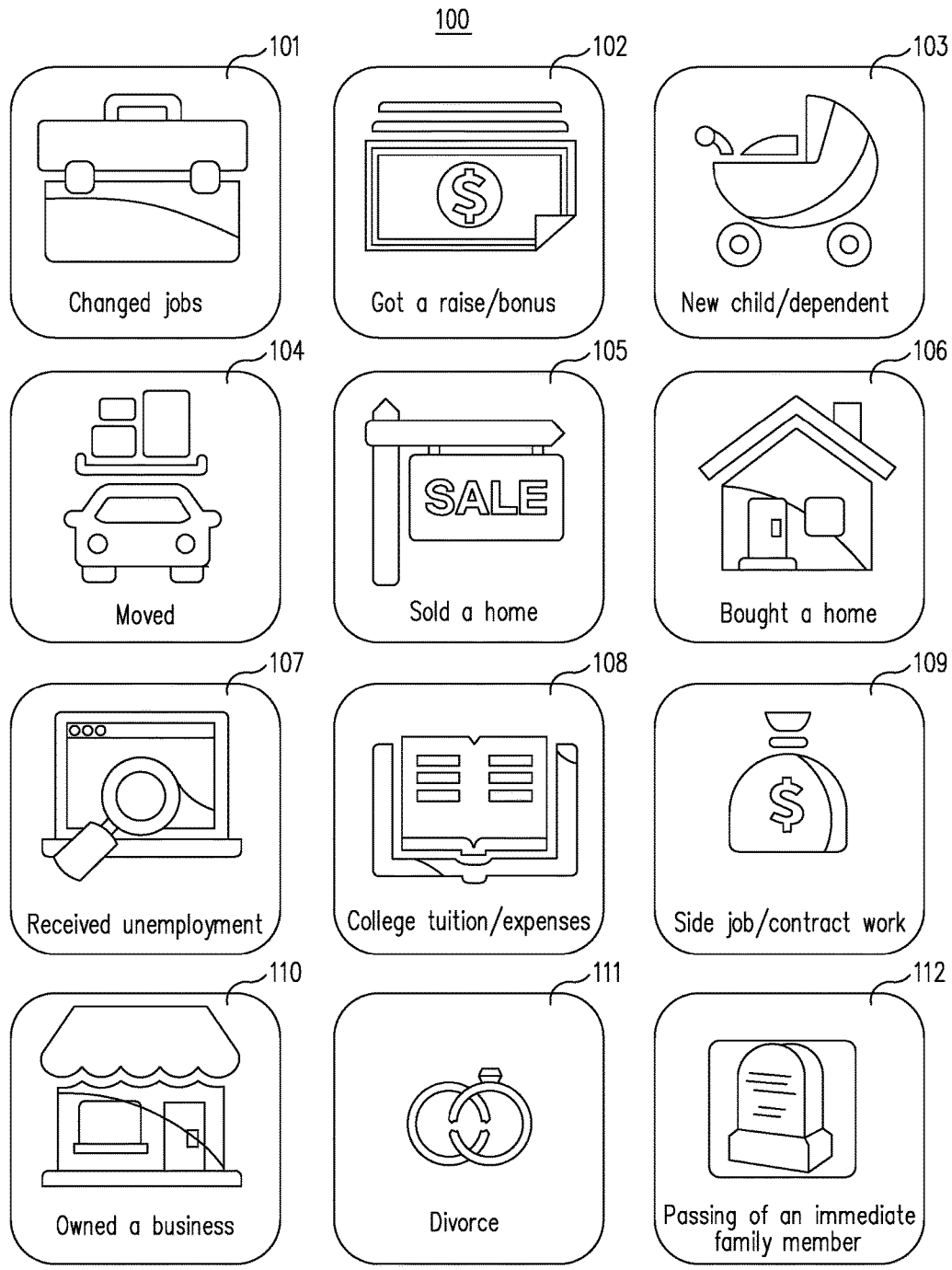
FIGS. 1A, 1B, and 1C illustrate diagrams of life events user interfaces that can be used by a tax return preparation system to provide a personalized user experience to a user based on the likelihood that one or more life events occurred for a user in a tax year, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein describe systems and processes suitable for providing a personalized user experience in a tax return preparation system based on predicted life events for a user, according to various embodiments.

Introductory System

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "user experience" includes not only the user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a person and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "analytics model" or "analytical model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "predicted" is used with regard to life events, and denotes a likelihood of one or more life events having occurred in a user's life and/or a likelihood of one or more life events occurring in a user's life (e.g., as determined by one or more predictive models or analytical models), according to one embodiment.

Hardware Architecture

The systems and methods of the present disclosure analyze numerous historical records of users of a tax return preparation system, and predict life events of a current user, with limited information, in order to personalize or tailor the current user's experience with the tax return preparation system, according to one embodiment. In particular, the systems and methods of the present disclosure show a user representations of one or more life events that the tax return preparation system has determined are likely to have occurred in the user's life during the previous tax year, according to one embodiment. The tax return preparation system allows the user to confirm that the one or more predicted/likely life events actually occurred for the user in the previous tax year.

Personalizing a user's experience with the tax return preparation system in this manner, even at the very beginning of the user's experience, provides a number of benefits to the user. When a user sees the tax return preparation engine present an icon representing a life event that the user had, the tax return preparation engine immediately instills confidence in the user that the tax return preparation system has the ability to address the particular life event in the user's tax return. By providing simple icons that represent life events of the user, the tax return preparation system enables the user to conveniently, quickly, and confidently provide information that can be used to further personalize the user's experience, according to one embodiment.

A tax return preparation system personalizes a tax return preparation interview for a user by predicting one or more life events of the user and by tailoring the user's experience based on the one or more predicted life events, according to one embodiment. The tax return preparation engine acquires user data about a user from one or more sources (e.g., public records, prior tax returns, the user clickstream, etc.), according to one embodiment. The tax return preparation engine applies the user data to one or more predictive models to determine the likelihood of occurrence of each of a number of available life event options, for the user, according to one embodiment. The tax return preparation system ranks the available life event options based on the likelihood that the life event options occurred for the user in a tax year (e.g., in the prior tax year), according to one embodiment. The tax return preparation system displays life event icons that represent the available life event options to the user, emphasizing those of the available life event options that are more likely to be relevant to the user and deemphasizing those of the available life event options that are less likely to be relevant to the user, according to one embodiment.

The tax return preparation system uses the user's interaction with the life event icons to prepare and deliver personalized user experiences to the user, according to one embodiment. The tax return preparation system gathers user data from the user when the user selects one or more of the displayed life event icons to confirm that the selected life event icons represent life events that occurred for the user in the tax year, according to one embodiment. The tax return preparation system uses the user data from the user to determine how to further personalize the tax return preparation interview, by adjusting one or more user experience options based on the life event icons selected by the user, according to one embodiment. The user experience options include, but are not limited to, which tax topics are presented to the user, the order in which tax topics are presented to the user, which questions are presented to a user, a sequence of tax-related questions that are presented to the user, the frequency and substance of marketing content provided to the user, and the like, according to one embodiment.

Figure 1B:
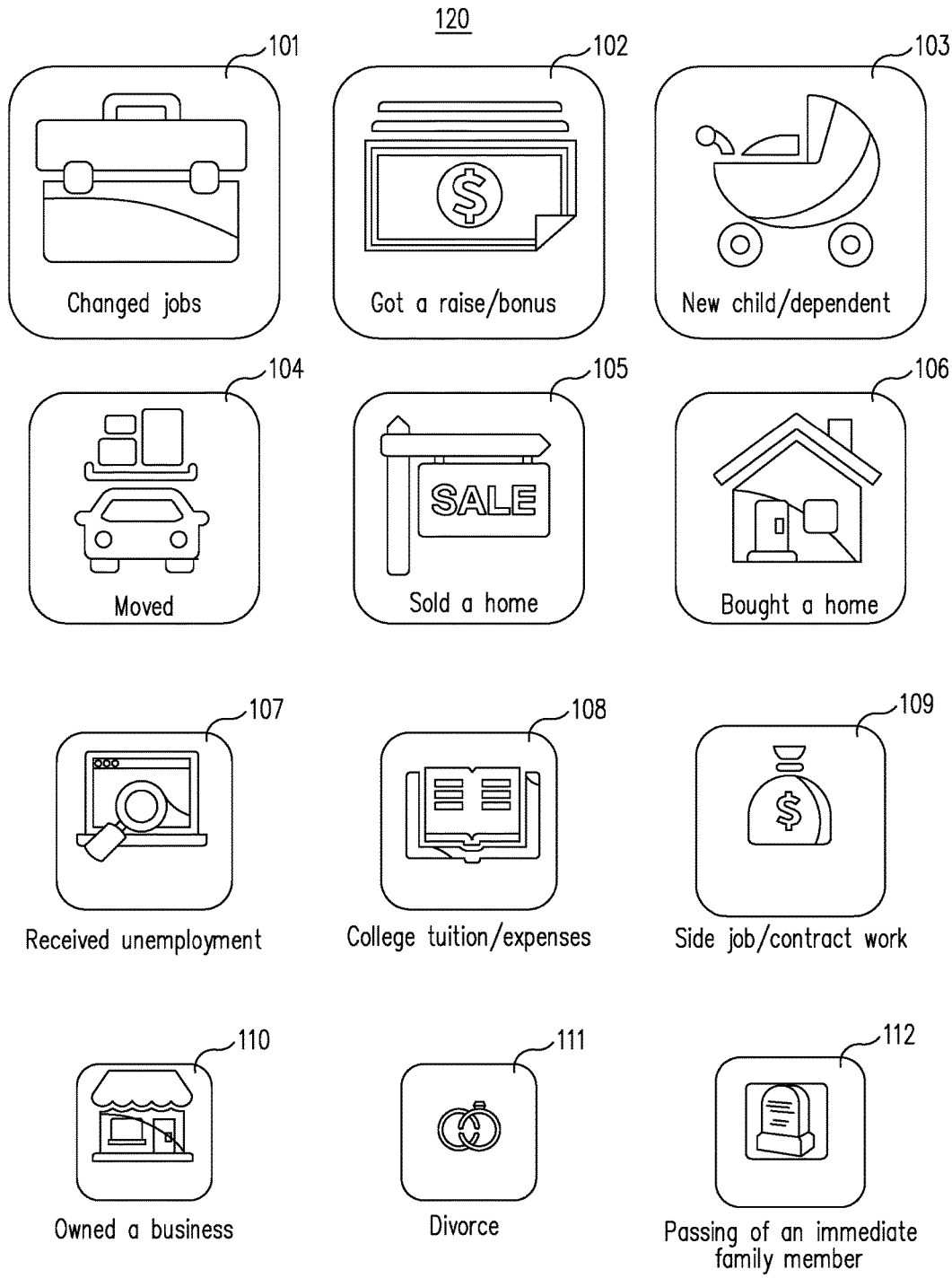
Figure 1C:
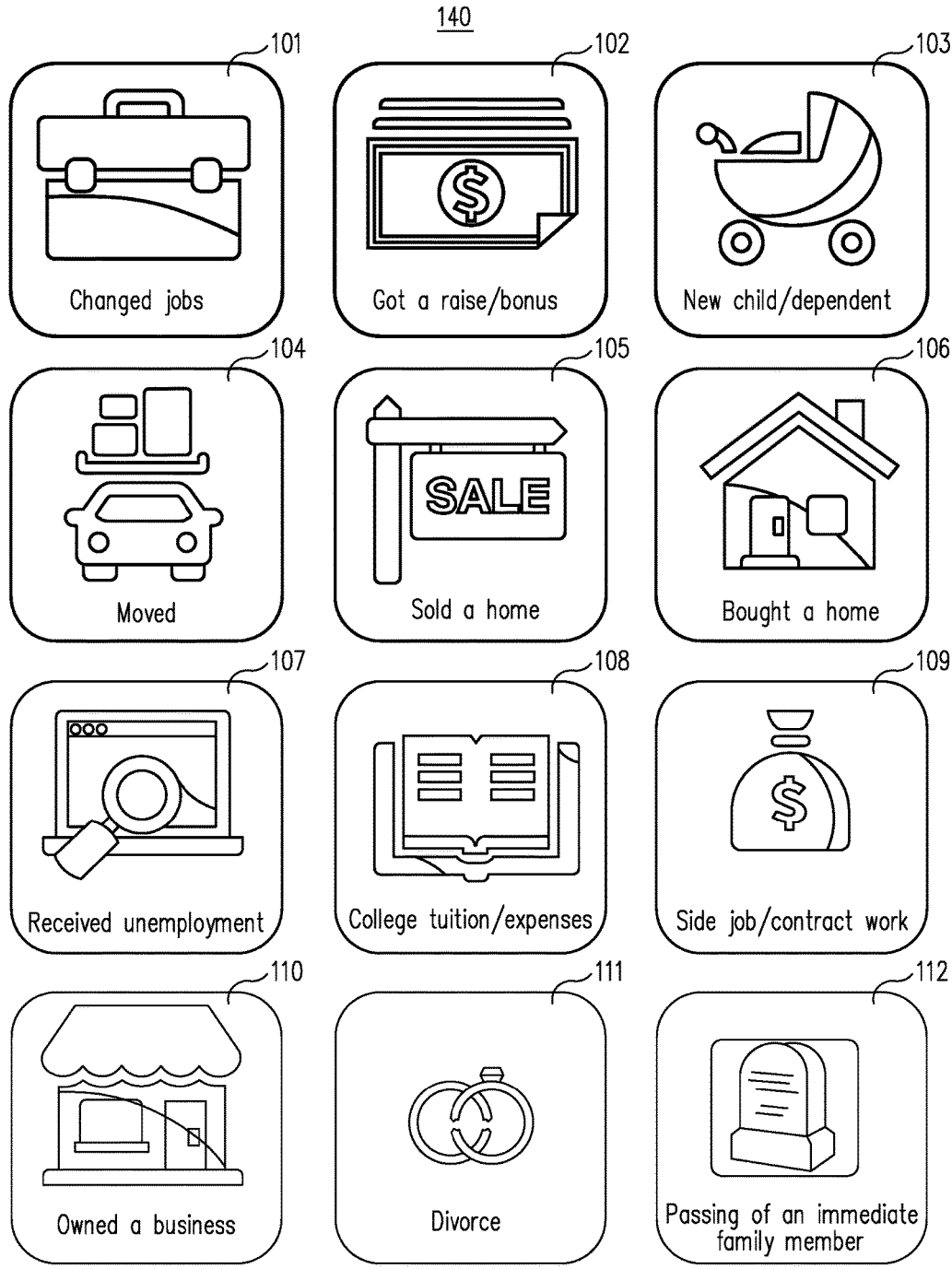

FIGS. 1A, 1B, and 1C illustrate diagrams of life events user interfaces that can be used by a tax return preparation system to provide a personalized user experience to a user based on the likelihood that one or more life events occurred for a user in a tax year, according to one embodiment. FIG. 1A includes a life events user interface 100 that is configured to be used during the tax return preparation interview to acclimate the user to the interview process by acquiring information (e.g., user data) from the user with techniques that do not require the user to perform research, according to one embodiment. The tax return preparation system ranks, sorts, and displays the life event icons based on the likelihood that the life events occurred for a user during a tax year (e.g., during the prior tax year for which a tax return is being prepared), according to one embodiment. In other words, the tax return preparation system ranks, sorts, and displays the life event icons based on a prediction by the tax return preparation system that is made with one or more predictive models, and the prediction (or likelihood determination) is based on user data that the tax return preparation system is able to gather about the user before requesting information directly from the user, according to one embodiment. The life events user interface 100 includes life event icons 101, 102, 103, 104, 105, 106, 107, 108, 109, 110, 111, and 112 (collectively life event icons 101-112), which represent life events or financial events that may have occurred in the life of the user during one or more previous tax years, according to one embodiment. The life event icons 101-112 are user interface outputs and inputs—outputs that display graphics, and inputs (e.g., buttons) that receive a selection or click from a user, according to one embodiment. The life event icons 101-112 respectively represent: changed jobs, got a raise/bonus, new child/dependent, moved, sold a home, bought a home, received unemployment, college tuition/expenses, side job/contract work, owned a business, divorce, and passing of a family member, according to one embodiment. Other graphics representing other life events are used, in other implementations. In one embodiment, different text or no text is displayed with the life event icons 101-112. Upon selection of a life event icon 101-112, the life event user interface 100 is configured to display a message that indicates that the tax return preparation system will address the subject of the life event icon during the interview, according to one embodiment. Although the life event icons 101-112 are displayed as tiles in the life events user interface 100, other user input elements (e.g., bubbles, avatars, graphics, buttons, menus, etc.) can be alternatively used to perform a similar function in the life events user interface 100, according to one embodiment. Additional tiles or fewer tiles can be used, and icons that represent other life or financial events or statuses (e.g., marriage, retirement, etc.) can also be used to acquire information from the user, according to one embodiment.

In one embodiment, the tax return preparation system uses the life events user interface 100 to emphasize those of the life event icons 101-112 that are determined to be more likely to have occurred in a user's life in a prior tax year, and to deemphasize those of the life event icons 101-112 that are determined to be less likely to have occurred in the user's life in the prior tax year. For example, the tax return preparation system can be configured to show life event icons of the more likely events in the first row, at the top of the life events user interface 100, and/or near the top of the life events user interface 100, according to one embodiment.

FIG. 1B includes a life events user interface 120 that shows another embodiment of the life event icons 101-112 ranked, sorted, and displayed based on the likelihood that the life events occurred for a user during a tax year, according to one embodiment. In one embodiment, the tax return preparation system uses the life events user interface 120 to emphasize those of the life event icons 101-112 that are determined to be more likely to have occurred in a user's life in a prior tax year, and to deemphasize those of the life event icons 101-112 that are determined to be less likely to have occurred in the user's life in the prior tax year. For example, the tax return preparation system can be configured to show life event icons of the more likely events in the first row, at the top of the life events user interface 100, near the top of the life events user interface 100, and/or with a larger size than the life event icons of the less likely events, according to one embodiment.

FIG. 1C includes a life events user interface 140 that shows another embodiment of the life event icons 101-112 ranked, sorted, and displayed based on the likelihood that the life events occurred for a user during a tax year, according to one embodiment. In one embodiment, the tax return preparation system uses the life events user interface 140 to emphasize those of the life event icons 101-112 that are determined to be more likely to have occurred in a user's life in a prior tax year, and to deemphasize those of the life event icons 101-112 that are determined to be less likely to have occurred in the user's life in the prior tax year. For example, the tax return preparation system can be configured to show life event icons of the more likely events in the first row, at the top of the life events user interface 100, near the top of the life events user interface 100, with darker outlines, and/or less transparency than the life event icons of the less likely events, according to one embodiment.

Figure 2:
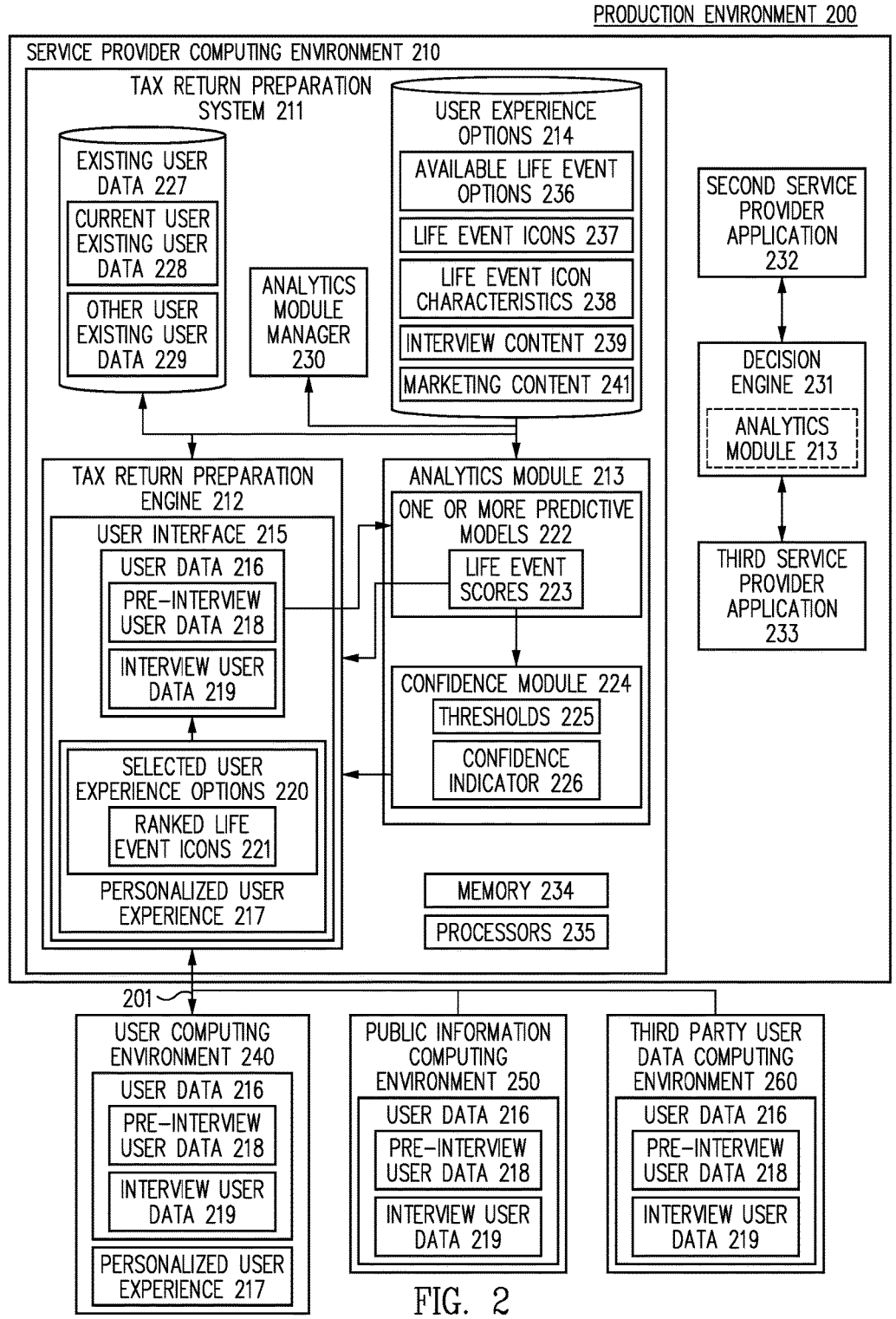
FIG. 2 is a block diagram of software architecture for providing a personalized user experience in a tax return preparation system based on predicted life events for a user, in accordance with one embodiment.

FIG. 2 illustrates a block diagram of a production environment 200 for providing a personalized user experience in a tax return preparation system based on predicted life events for a user, according to one embodiment. The production environment 200 includes a service provider computing environment 210, a user computing environment 240, a public information computing environment 250, and a third party user data computing environment 260 for providing a personalized user experience in a tax return preparation system based on predictions/likelihoods of one or more life events occurring in a tax year for a user, according to one embodiment. The computing environments 210, 240, 250, and 260 are communicatively coupled to each other with a communication channel 201, to support providing a personalized user experience in a tax return preparation system based on predictions/likelihoods of one or more life events occurring in a tax year for the user, according to one embodiment.

The service provider computing environment 210 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 210 represents a traditional data center computing environment, a virtual asset computing environment (e.g., a cloud computing environment), or a hybrid between a traditional data center computing environment and a virtual asset computing environment, according to one embodiment. The one or more applications can include, but are not limited to tax return preparation systems, personal financial management systems, business financial management systems, and applications that support the tax return preparation systems and/or the other financial management systems, according to one embodiment. The service provider computing environment 210 includes a tax return preparation system 211 that is a software system that utilizes one or more predictive models to determine the likelihood that one or more life events occurred for a user during the previous tax year, according to one embodiment. The tax return preparation system 211 uses the results of the one or more predictive models to rank life event icons that represent available life event options, and to present the ranked life event options to the user in a manner that emphasizes the life event icons that have a higher likelihood of relevance to the user and that de-emphasizes life event icons that have a lower likelihood of relevance to the user, according to one embodiment. The life event icons show the user that the tax return preparation system 211 has the ability to address any life events that might be relevant to preparing the user's tax return, according to one embodiment. Furthermore, displaying the life event icons enables the tax return preparation system 211 to receive confirmation from the user regarding which life events occurred in a tax year for the user, and enables the tax return preparation system to tailor the remainder of the tax return preparation interview to the user's specific situation to increase the likelihood that relevant interview content is presented to the user and to increase a likelihood that less relevant or irrelevant interview content is deemphasized for the user, according to one embodiment. The tax return preparation system 211 includes various components, databases, engines, modules, and data to support providing a personalized user experience in a tax return preparation system based on predicted life events for the user, according to one embodiment. The tax return preparation system 211 includes a tax return preparation engine 212, an analytics module 213, and user experience options 214, according to one embodiment.

The tax return preparation engine 212 guides the user through a tax return preparation interview, according to one embodiment. The tax return preparation interview can be broken into multiple tax return preparation sessions, during which the user accesses or "logs into" the tax return preparation system 211, according to one embodiment. A user may access or login to the tax return preparation system 211 multiple times, e.g., in multiple sessions, to complete a tax return preparation interview. At the end of a tax return preparation interview, the tax return preparation system 211 files a federal tax return, and may file one or more state tax returns (as needed), in response to receiving instructions from the user to do so, according to one embodiment. Thus, a tax return preparation process can include, but is not limited to: completing a tax return preparation interview to enable the tax return preparation system 211 to complete/prepare a tax return for the user, and filing one or more federal and state tax returns, according to one embodiment. The completion and filing of the one or more federal and state tax returns are processed over one or more tax return preparation sessions, in which the user accesses or logs into the tax return preparation system 211, according to one embodiment.

The tax return preparation engine 212 and/or the tax return preparation system 211 are configured to gather user data about the user and provide ranked/sorted life event icons to the user to facilitate transitioning the user into the tax return preparation interview, while assuring the user that the tax return preparation system 211 is capable of addressing any life events that may have occurred for the user in a prior tax year, according to one embodiment. The tax return preparation engine 212 and/or the tax return preparation system 211 are configured to receive selections of the ranked life event icons, from the user, to indicate which of the one or more ranked life event icons represent life events that occurred for the user and one or more tax years (e.g., in the previous tax year), according to one embodiment.

The tax return preparation engine 212 includes a user interface 215 to gather and receive user data 216 from the user and to present a personalized user experience 217 to the user, to conveniently transition the user into and through the tax return preparation process, according to one embodiment. The user interface 215 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating the personalized user experience 217 to the user and for receiving the user data 216 from the user and from one or more other sources of data, according to one embodiment.

The user data 216 received by the user interface 215 represents both the information that is obtained from the user through the user computing environment 240, as well as information that is obtained about the user from other sources, such as existing user data 227, the public information computing environment 250, and/or the third party user data computing environment 260, according to one embodiment. For example, the user data 216 from the existing user data 227 includes current user existing user data 228 and other user existing user data 229, which includes one or more previous tax returns' data in addition to other information stored by the tax return preparation system 211 about the current user and about other users of the tax return preparation system 211, according to one embodiment. The existing user data 227 and/or the acquired/received user data 216 are stored in a data store, a database, and/or a data structure, according to one embodiment. Examples of the user data 216 include, but are not limited to, clickstream data, type of web browser, type of operating system, manufacturer of computing system, whether the user's computing system is a mobile device or not, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system or in the preparation of a user's tax return, according to various embodiments. In some implementations, the user data 216 is a subset of all of the user information used by the tax return preparation system 211 to prepare the user's tax return, e.g., is limited to marital status, children's information, and annual income.

The pre-interview user data 218 can be limited to a subset of the user data 216 that includes information acquired about the user and not from the user as a response to one or more questions, e.g., as part of the tax return preparation interview, according to one embodiment. The pre-interview user data 218 includes, but is not limited to, clickstream data, death certificates, birth certificates, public records, an age of the user, an age of a spouse of the user, a zip code, a tax return filing status, state income, a home ownership status, a home rental status, a retirement status, a student status, graduation records, an occupation of the user, an occupation of a spouse of the user, whether the user is claimed as a dependent, whether a spouse of the user is claimed as a dependent, whether another taxpayer is capable of claiming the user as a dependent, whether a spouse of the user is capable of being claimed as a dependent, salary and wages, taxable interest income, ordinary dividend income, qualified dividend income, business income, farm income, capital gains income, taxable pension income, pension income amount, IRA distributions, unemployment compensation, taxable IRA, taxable Social Security income, amount of Social Security income, amount of local state taxes paid, whether the user filed a previous years' federal itemized deduction, whether the user filed a previous years' state itemized deduction, number of dependents, and whether the user is a returning user to the tax return preparation system, according to one embodiment. The pre-interview user data 218 can also include browsing behavior data that is obtained from the user's interaction with the user interface 215 of the tax return preparation system 211, according to one embodiment. The pre-interview user data 218 and the existing user data 227 can also include information that the tax return preparation system gathers directly from one or more external sources (e.g. from the public information computing environment 250 and/or from the third party user data computing environment 260) such as, but not limited to, Internet advertising companies, public records servers, social media servers, a payroll management company, state agencies, federal agencies, employers, military records, public records, private companies, and the like, according to one embodiment.

The interview user data 219 is different than the pre-interview user data 218, although some of the pre-interview user data 218 may overlap with the interview user data 219, if the interview user data 219 is redundantly received during the tax return preparation interview, according to one embodiment. The interview user data 219 includes parts of the user data 216 that are received from the user as the user interacts with the tax return preparation system 211, according to one embodiment. The interview user data 219 is received from the user when the user selects one or more life event icons, buttons, etc. and when the user enters/provides other requested information, according to one embodiment. The interview user data 219 includes parts of the user data 216 that are received from one or more third party sources and/or public records as the user interacts with the tax return preparation system 211, according to one embodiment. The user data 216 can dynamically change as the user enters additional information, so the tax return preparation engine 212 can be configured to periodically or continuously receive, update, and transmit the user data 216 to the analytics module 213 to enable the analytics module 213 to continuously update the likelihood that one or more life events have occurred or will occur for the user.

The tax return preparation engine 212 delivers the personalized user experience 217 to the user based on one or more of the pre-interview user data 218, the interview user data 219, and other portions of the user data 216, according to one embodiment. The personalized user experience 217 includes selected user experience options 220, and the selected user experience options 220 include ranked life event icons 221, according to one embodiment. The ranked life event icons 221 are selected by the tax return preparation engine 212 from the user experience options 214, according to one embodiment. The ranked life event icons 221 are selected by the tax return preparation engine 212 based on a life event score and/or a confidence indicator that is generated by the analytics module 213 based on the pre-interview user data 218, according to one embodiment. An example of the ranked life event icons 221 is shown in the life events user interfaces 100, 120, 140, that are shown in FIGS. 1A, 1B, and 1C, according to one embodiment. The ranked life event icons 221 have a dual function, in that they provide information to the user with an icon and they are buttons that are selectable (or "clickable") by a user to capture a selection of one or more of the ranked life event icons 221 by user, according to one embodiment. When a user selects one or more of the ranked life event icons 221, the user's selection indicates to the tax return preparation system 211 that the selected ones of the ranked life event icons 221 are relevant to the user, e.g., the selected ones of the ranked life event icons 221 represent life events that occurred for the user in one or more prior tax years, according to one embodiment. In one embodiment, each time a user selects (e.g., by clicking, touching, or using a stylus) one of the ranked life event icons 221, the tax return preparation system 211 highlights the selection for the user by, for example, changing the color, changing the size, changing the emphasis, and/or performing one or more other alterations to characteristics of the life event icons that are selected by the user.

After the user has viewed, selected, and/or confirmed selection of one or more of the ranked life event icons 221 (e.g., using the life events user interface 100, 120, and/or 140 that are shown in FIGS. 1A, 1B, and/or 1C, respectively), the tax return preparation system 211 and/or the tax return preparation engine 212 updates the personalized user experience 217 with other selected user experience options 220 from the user experience options 214, according to one embodiment. For example, based on the interview user data 219, the analytics module 213 may generate additional life events scores and/or additional confidence indicators that correspond to other available life event options for the user, according to one embodiment. The tax return preparation system 211 and/or the tax return preparation engine 212 uses the additional life event scores and/or additional confidence indicators to select various interview content (from the user experience options 214) to personalize the user's experience, such as: types of confirmations (e.g., a button confirmation, a confirmation notice, or no confirmation), quantities of explanation details (e.g., a significant amount of explanation detail, brief explanation detail, no explanation detail), types of tax-related questions, quantities of tax-related questions, sequences of tax-related questions, tax topics, sequences of tax topics, user interface options (e.g., tables, menu trees, etc.), marketing content (e.g., email offers, available services notifications, etc.), and the like.

The analytics module 213 receives the user data 216 and determines the likelihood that one or more available life event options occurred or will occur in the life of a user during a particular tax year (e.g., a previous tax year, present tax year, and/or a subsequent tax year), according to one embodiment. The analytics module 213 includes one or more predictive models 222 for determining a likelihood that one or more available life event options occurred or will occur in the life of the user during a particular tax year, according to one embodiment.

The analytics module 213 applies the pre-interview user data 218 to the one or more predictive models 222 to generate a life event scores 223, which represent the likelihood that one or more available life event options occurred in the life of the user during a previous tax year, according to one embodiment. Each one of the life events scores 223 corresponds with a single available life event option, according to one embodiment. The output of the one or more predictive models 222 is a life event score that is between 0 and 1, according to one embodiment. The higher the value of life events scores 223, the more likely it is that a particular available life event occurred for the user in a previous tax year, according to one embodiment. The analytics module 213 generates a life events score for each of the available life event options that are included in the user experience options 214, according to one embodiment. By generating a life event score for each of the available life event options that are included in the user experience options 214, the analytics module 213 enables the tax return preparation system 211 to rank and/or sort the available life event options and their corresponding life event icons, for integration into the personalized user experience 217 and for delivery to the user, according to one embodiment.

In one embodiment, the available life event options having the highest life events scores 223 are emphasized in the personalized user experience 217, and represent the ranked life event icons 221, according to one embodiment. The available life event options are emphasized in the personalized user experience 217 by varying the location, size, visibility, or other characteristics of the ranked life event icons 221, based on the life events scores 223, according to one embodiment. In one embodiment, the ranked life event icons 221 that correspond with the highest life events scores 223 are placed at the top of a life events user interface (e.g., the life events user interface 100 shown in FIG. 1), while the ranked life event icons 221 correspond with the lowest life events scores 223 are placed at the bottom of a life events user interface, according to one embodiment. In one embodiment, the ranked life event icons 221 are located in the personalized user experience 217 (e.g., in the life events user interface 100 shown in FIG. 1) in the descending order based on the life events scores 223 for the available life event options that correspond with the ranked life event icons 221, according to one embodiment. In other words, if the ranked life event icons 221 are located in a life event user interface in rows and columns, the top row in the life event user interface will include the ranked life event icons 221 correspond with the highest life events scores 223 and the bottom row in the life event user interface will include the ranked life event icons 221 correspond with the lowest life events scores 223, in order to emphasize the available life event options that are more likely to be relevant to the user and in order to deemphasize the available life event options that are less likely to be relevant to the user, according to one embodiment.

There are many advantages to presenting the ranked life event icons 221 to the user, based on the likelihood of relevance/occurrence to the user. For example, when the user sees icons that represent life events that have occurred in the user's life, the tax return preparation system 211 confirms in the user's mind that the tax return preparation system 211 understands that those types of life events occur in people's lives. As another example, when a user sees icons that represent life events have occurred in the user's life, the tax return preparation system 211 confirms in the user's mind that the tax return preparation system 211 has the capability to address such life events in the preparation of a tax return. As another example, when the user sees icons that represent life events for the current users life, emphasized at the top of a life event user interface, the tax return preparation system 211 may help the user feel that the tax return preparation process is going to be convenient and easy because the information that is relevant to the user is presented in a way that is more visible and/or emphasized and/or more conveniently accessible, then the less relevant information, according to one embodiment.

The analytics module 213 uses one or more techniques for analyzing the life events scores 223, according to one embodiment. The analytics module 213 includes a confidence module 224 for analyzing the life events scores 223, according to one embodiment. The confidence module 224 receives the life events scores 223, and compares the life events scores 223 to one or more thresholds 225. The thresholds 225 can be implemented as a single threshold, can be implemented as two thresholds, or can be implemented as multiple thresholds, in order to define one or more confidence regions, according to one embodiment. For example, the thresholds 225 can include a first threshold, e.g., 0.8, which when a life event score exceeds the first threshold, the confidence module 224 provides a confidence indicator 226 that the user is highly likely to have had a particular life event occur in the previous tax year. In one embodiment, the confidence indicator 226 is a flag, such as a "divorced" flag.

As another example, the thresholds 225 can include a second threshold, e.g., 0.5, which when the life events score is below the second threshold, the confidence module 224 provides a confidence indicator 226 that the user is not very likely to have had a particular life event occur in the previous tax. In one embodiment, the confidence indicator 226 is a flag, such as a "new child/dependent" flag. In one embodiment, the confidence module 224 outputs the life events scores 223 and more than one confidence indicator 226 to the tax return preparation engine 212, to enable the tax return preparation engine 212 to make suggestions or recommendations to the user\or to otherwise provide a personalized user experience 217, according to one embodiment.

In one embodiment, the one or more predictive models 222 and/or the confidence module 224 takes into account the source of the pre-interview user data 218, the source of the interview user data 219, and/or the source of other portions of the user data 216 when determining the life events scores 223 and/or when determining the confidence indicator 226, according to one embodiment. For example, the one or more predictive models 222 can be configured to generate a higher value for a life event score if the source of the user data 216 is from a reputable source, e.g., from a previous year's tax return, from a third party payroll company (e.g. ADP), from a military record, from a birth certificate, from a death certificate, etc., according to one embodiment. In one embodiment, the one or more predictive models 222 are configured to generate a lower value for a life event score if the source of the user data 216 is from a less reputable source, e.g., the source of the data is not current, is likely to be inaccurate, and/or if the information received is incomplete.

The tax return preparation system 211 and/or the tax return preparation engine 212 uses the output of the analytics module 213 to rank, prioritize, emphasize, and/or deemphasize the selected user experience options 220 that are presented to a user in the personalized user experience 217, according to one embodiment. In addition to emphasizing and deemphasizing the life event icons 221, the tax return preparation system 211 and/or the tax return preparation engine 212 uses the output of the analytics module 213 to rank, order, prioritize, emphasize, deemphasize, show, and/or hide other interview content such as tax-related questions, tax topics, sequences of tax-related questions, sequences of tax topics, and the like, according to one embodiment.

The tax return preparation system 211 and/or the tax return preparation engine 212 use the user experience options 214 to generate the personalized user experience 217, according to one embodiment. The tax return preparation system 211 and/or the tax return preparation engine 212 selects one or more of the user experience options 214 to be the selected user experience options 220, according to one embodiment. The user experience options 214 include available life event options 236, life event icons 237, life event icon characteristics 238, interview content 239, and marketing content 241, according to one embodiment.

The available life event options 236 can include a number of different types of life events that may affect a user's tax return and that the tax return preparation system 211 can be configured to account for while preparing the users tax return, according to one embodiment. The available life event options 236 include, but are not limited to, changing jobs, receiving a raise or bonus, gaining a new child/dependent, moving, selling a home, buying a home, receiving unemployment income, incurring college/educational expenses, receiving side job income or contract work income, owning a business, getting divorced, having an immediate family member pass away, and the like, according to one embodiment. The user experience options 214 includes a number of life event icons 237, which correspond to the available life event options 236, according to one embodiment. In other words, each one of the available life event options 236 corresponds with one of the life event icons 237, according to one embodiment.

Each of the life event icons 237 includes life event icon characteristics 238, according to one embodiment. The life event icon characteristics 238 includes, but is not limited to, size, shape, quantity/amount of emphasis, line thickness of an outline, color, location in a life event user interface (e.g., the life events user interface 100, 120, and/or 140 as shown in FIGS. 1A, 1B, and/or 1C, according to one embodiment. The tax return preparation system 211 and/or the tax return preparation engine 212 applies one or more of the life event icon characteristics 238 to one or more of the life event icons 237 based on one or more of the available life event options 236 that the analytics module 213 has determined are likely or unlikely to have occurred or to occur in the life of a user in a previous tax year, current tax year, or future tax year, according to one embodiment.

The tax return preparation system 211 and/or the tax return preparation engine 212 uses the interview content 239 from the user experience options 214 as some of the selected user experience options 220 to populate/generate the personalized user experience 217, according to one embodiment. As discussed previously, the interview content 239 can include, but is not limited to, tax-related questions, sequences of tax-related questions, tax topics, sequences of tax topics, audio media, video media, color schemes, icons, avatars, graphics, menu styles, the quantity and/or style of explanation details for aspects of the tax return preparation interview, and other user interface elements used to provide information to and/or receive information from the user while progressing the user through the tax return preparation interview to prepare and/or file a user's tax return, according to one embodiment.

The tax return preparation system 211 and/or the tax return preparation engine 212 uses the marketing content 241 from the user expense options 214 as some of the selected user experience options 220 to populate/generate the personalized user experience 217, according to one embodiment. The marketing content 241 includes advertisements, reminders, information, and special request that are provided to the user by email, via text message, via a webpage browser display, via chat dialog box, and/or other telecommunications techniques, according to one embodiment. The tax return preparation system 211 assess or the tax return preparation engine 212 selects and transmits portions of the marketing content 241 in the personalized user experience 217 to the user, at least partially based on the analytics module 213 determining that one or more life events are likely to occur for the user, based on the user data 216 that the tax return preparation system 211 receives for the user, according to one embodiment. As an example, if the one or more predictive models 222 analyzes the user data 216 and generates life events scores 223 that correspond to a high likelihood that a user will purchase a new home in the present tax year, the tax return preparation system 211 and/or the second service provider application 232 is configured to transmit an email to the user during the present tax year to notify the user that the tax return preparation system 211 can account for the purchase of a new home for the user during the following tax season, according to one embodiment.

The service provider computing environment 210 includes an analytics module manager 230 that trains the one or more predictive models 222 using existing user data 227, according to one embodiment. The existing user data 227 includes current user existing user data 228 and other user existing user data 229, according to one embodiment. The existing user data 227 includes tax data collected from previous years' tax return filings and/or includes tax data collected from a current year by users who have partially or completely prepared their tax returns using the tax return preparation system 211, according to one embodiment. The existing user data 227 includes user data 216 acquired from the public information computing environment 250 (e.g., military records, birth records, death records, home ownership records, etc.) and/or from the third party user data computing environment 260 (e.g., online advertising agencies, payroll account servers, etc.), according to one embodiment. The analytics module manager 230 trains the one or more predictive models 222 using one or more of a variety of machine learning techniques including, but not limited to, regression, logistic regression, decision trees, artificial neural networks, support vector machines, linear regression, nearest neighbor methods, distance based methods, naive Bayes, linear discriminant analysis, k-nearest neighbor algorithm, or another mathematical, statistical, logical, or relational algorithm to determine correlations or other relationships between the user data (e.g., personal information, income information, tax filing timing, etc.) and the likelihood of a life event having occurred or occurring in the life of the user.

The analytics module 213 is illustrated and described as being incorporated in the tax return preparation system 211, but in alternative embodiments, the analytics module 213 is implemented independently of the tax return preparation system within the service provider computing environment 210 in, for example, a decision engine 231. The analytics module 213 is optionally hosted on a different server, a different computing system, a different virtual device and/or as a different application than the tax return preparation system 211, according to one embodiment. The analytics module 213, when implemented externally to the tax return preparation system 211 (e.g., within the decision engine 231), receives the user data 216 from the tax return preparation system 211 over one or more networks and returns the life events scores 223 and/or the confidence indicator 226 to the tax return preparation system 211 to enable the tax return preparation system 211 to select and/or rank life event icons, based on the likelihood that one or more life event options occurred or will occur in the life of the user during a previous, current, or future tax year, according to one embodiment. In one embodiment, a second service provider application 232 and/or a third service provider application 233 also receives the services of the analytics module 213 (e.g., through the decision engine 231), and the analytics module 213 is modularized to enable exchanging, updating, and/or replacing one or more of the one or more predictive models 222 without interrupting or without changing the applications hosted by the service provider computing environment 210 (e.g., the tax return preparation system 211).

The service provider computing environment 210 and/or the tax return preparation system 211 includes memory 234 and processors 235 to support operations of the tax return preparation system 211 in providing a personalized user experience in a tax return preparation system based on predicted life events for user, according to one embodiment.

Process

Figure 3:
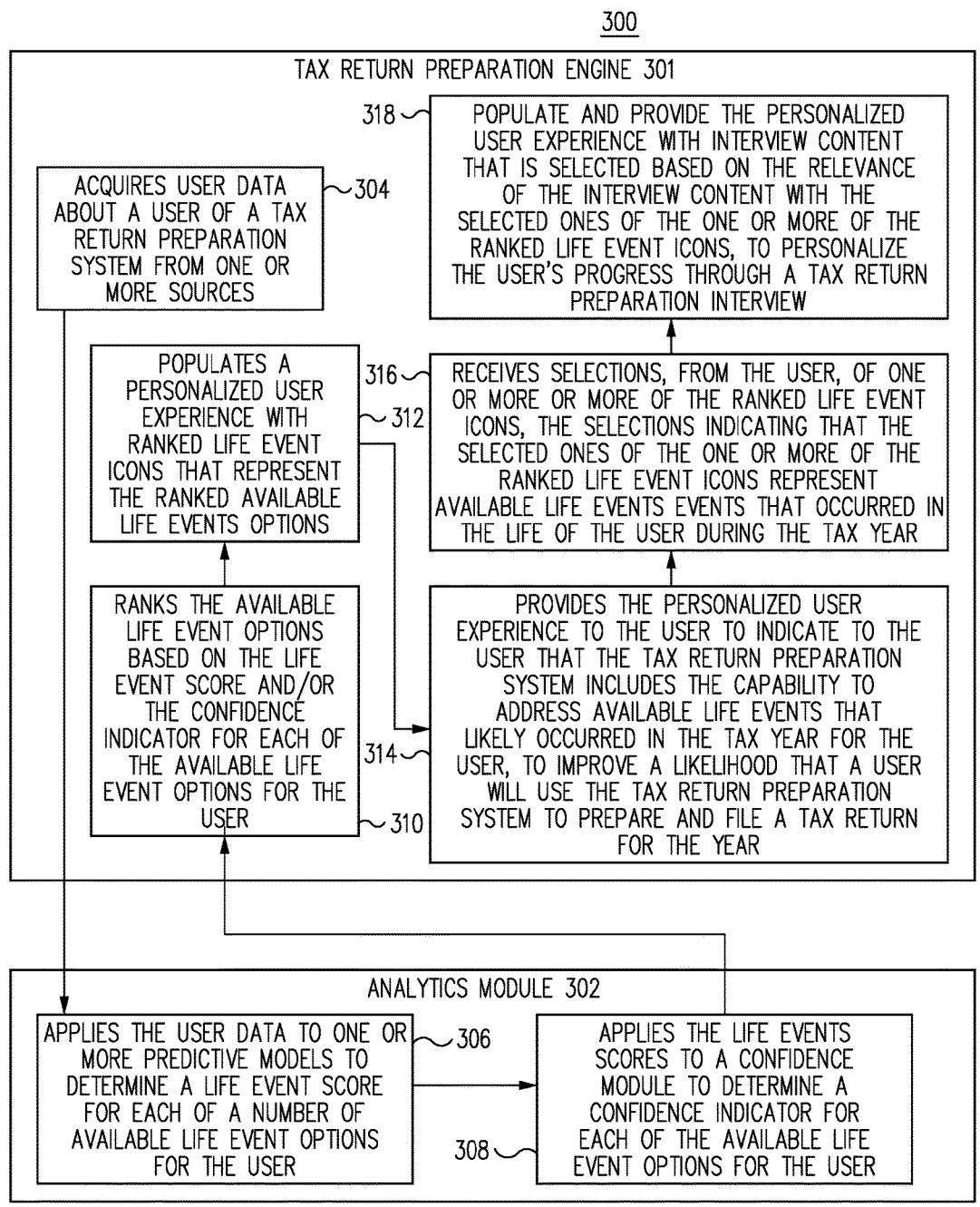
FIG. 3 is a flow diagram of a process for providing a personalized user experience in a tax return preparation system based on predicted life events for a user, according to one embodiment

FIG. 3 illustrates a flow diagram of a process 300 for providing a personalized user experience in a tax return preparation system based on predicted life events for a user, according to various embodiments. The process 300 includes one or more operations by a tax return preparation engine 301 and an analytics module 302 in a tax return preparation system, according to one embodiment. The tax return preparation engine 301 is the tax return preparation engine 212 that is shown in FIG. 1, according to one embodiment. The analytics module 302 is the analytics module 213 that is shown in FIG. 1, according to one embodiment.

At operation 304, the tax return preparation engine 301 acquires user data about a user of a tax return preparation system from one or more sources, according to one embodiment. In one embodiment, the tax return preparation engine 301 acquires user data about the user from sources other than having the user answer one or more questions (e.g., public records, monitoring user clickstream data, the user's IP address, third-party data vendors), according to one embodiment. Operation 304 proceeds to operation 306, according to one embodiment.

At operation 306, the analytics module 302 applies the user data to one or more predictive models to determine a life event score for each of a number of available life event options for the user, according to one embodiment. The life event score represents a likelihood of occurrence of an available life event option, and the life of the user in a particular tax year (e.g., in the previous tax year), according to one embodiment. The one or more predictive models are trained using existing data for the user and/or existing data from other users of the tax return preparation system, according to one embodiment. The one or more predictive models are trained using data acquired from one or more third-party sources (e.g., public records, advertising companies, etc.), according to one embodiment. Operation 306 proceeds to operation 308, according to one embodiment.

At operation 308, the analytics module 302 applies the life events scores to a confidence module to determine a confidence indicator for each of the available life event options for the user, according to one embodiment. The analytics module 302 determines the confidence indicator at least partially based on the source of the user data that is applied to the analytics module 302, according to one embodiment. The confidence indicator is a binary indicator indicating whether a user is highly likely or not to have experienced one or more of the available life event options, according to one embodiment. Operation 308 proceeds to operation 310, according to one embodiment.

At operation 310, the tax return preparation engine 301 ranks the available life event options based on the life event score and/or the confidence indicator for each of the available life event options for the user, according to one embodiment. In one embodiment, ranking the available life event options includes emphasizing the available life event options that are more likely to have occurred in the user's life, and deemphasizing the available life event options that are less likely to have occurred in the user's life. In one embodiment, emphasizing the available life event options includes changing the size, highlighting icons, manipulating the location/placement in a user interface, and/or otherwise adjusting characteristics of icons that represent the relevant available life event options, according to one embodiment. Operation 310 proceeds to operation 312, according to one embodiment.

At operation 312, the tax return preparation engine 301 populates a personalized user experience with ranked life event icons that represent the ranked available life events options, according to one embodiment. Operation 312 proceeds to operation 314, according to one embodiment.

At operation 314, the tax return preparation engine 301 provides the personalized user experience to the user to indicate to the user that the tax return preparation system includes the capability to address available life events that likely occurred in the tax year for the user, to improve a likelihood that a user will use the tax return preparation system to prepare and file a tax return for the user, according to one embodiment. Operation 314 proceeds to operation 316, according to one embodiment.

At operation 316, the tax return preparation engine 301 receives selections, from the user, of one or more of the ranked life event icons, the selections indicating that the selected ones of the one or more of the ranked life event icons represent available life events that occurred in the life of the user during the tax year, according to one embodiment. Operation 316 proceeds to operation 318, according to one embodiment.

At operation 318, the tax return preparation engine 301 populates and provides the personalized user experience with interview content that is selected based on the relevance of the interview content with the selected ones of the one or more of the ranked life event icons, to personalize the user's progress through a tax return preparation interview, according to one embodiment.

Figure 4:
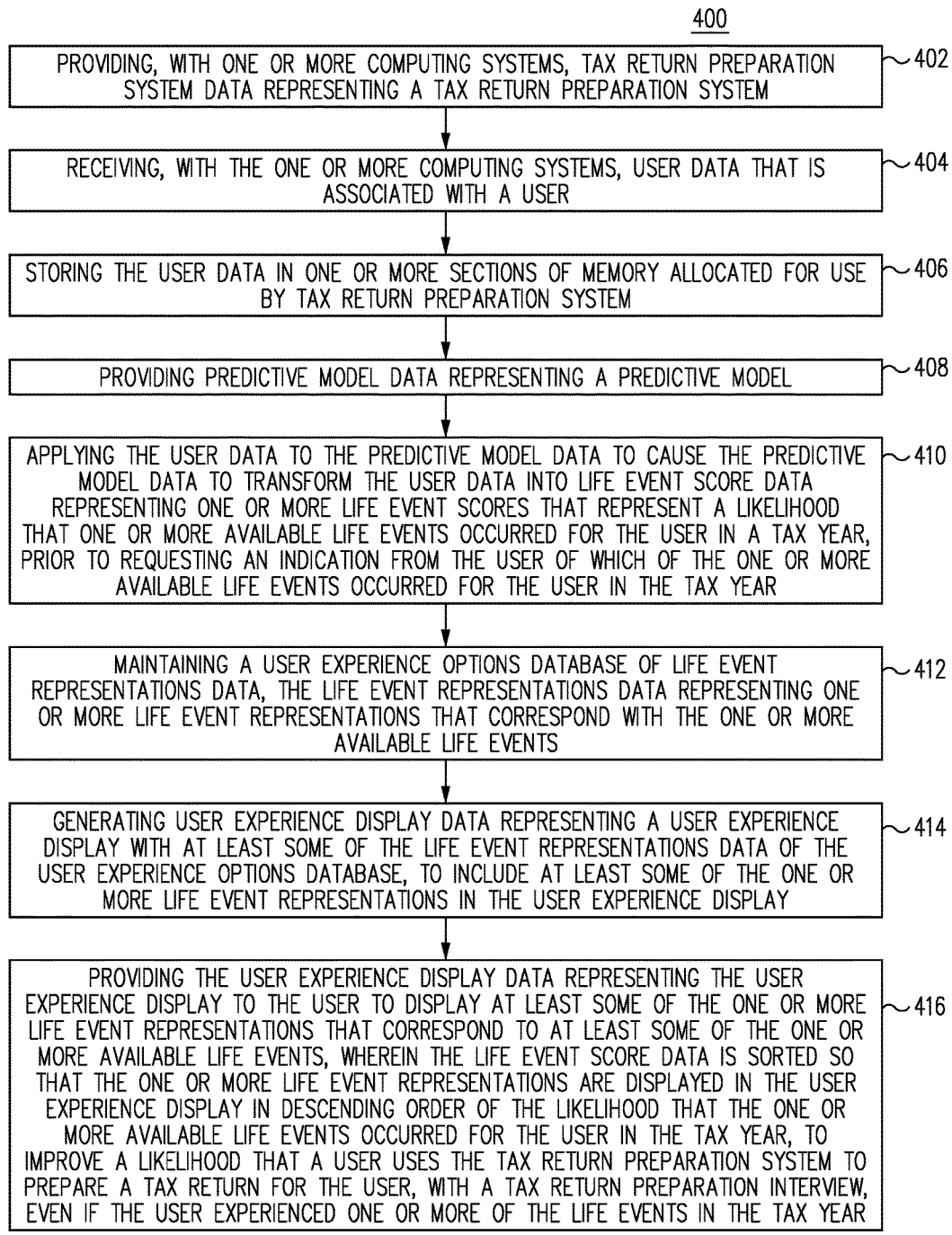
FIG. 4 is a flow diagram for providing a personalized user experience in a tax return preparation system based on predicted life events for a user, in accordance with one embodiment.

FIG. 4 illustrates an example of a process 400 for providing a personalized user experience in a tax return preparation system based on likelihoods of occurrences of life events for a user, according to one embodiment.

At operation 402, the process includes providing, with one or more computing systems, tax return preparation system data representing a tax return preparation system, according to one embodiment. Operation 402 proceeds to operation 404, according to one embodiment.

At operation 404, the process includes receiving, with the one or more computing systems, user data that is associated with a user, according to one embodiment. Operation 404 proceeds to operation 406, according to one embodiment.

At operation 406, the process includes storing the user data in one or more sections of memory allocated for use by tax return preparation system, according to one embodiment. Operation 406 proceeds to operation 408, according to one embodiment.

At operation 408, the process includes providing predictive model data representing a predictive model, according to one embodiment. Operation 408 proceeds to operation 410, according to one embodiment.

At operation 410, the process includes applying the user data to the predictive model data to cause the predictive model data to transform the user data into life event score data representing one or more life event scores that represent a likelihood that one or more available life events occurred for the user in a tax year, prior to requesting an indication from the user of which of the one or more available life events occurred for the user in the tax year, according to one embodiment. Operation 410 proceeds to operation 412, according to one embodiment.

At operation 412, the process includes maintaining a user experience options database of life event representations data, the life event representations data representing one or more life event representations that correspond with the one or more available life events, according to one embodiment. Operation 412 proceeds to operation 414, according to one embodiment.

At operation 414, the process includes generating user experience display data representing a user experience display with at least some of the life event representations data of the user experience options database, to include at least some of the one or more life event representations in the user experience display, according to one embodiment. Operation 414 proceeds to operation 416, according to one embodiment.

At operation 416, the process includes providing the user experience display data representing the user experience display to the user to display at least some of the one or more life event representations that correspond to at least some of the one or more available life events, wherein the life event score data is sorted so that the one or more life event representations are displayed in the user experience display in descending order of the likelihood that the one or more available life events occurred for the user in the tax year, to improve a likelihood that a user uses the tax return preparation system to prepare a tax return for the user, with a tax return preparation interview, even if the user experienced one or more of the life events in the tax year, according to one embodiment.

As noted above, the specific illustrative examples discussed above are but illustrative examples of implementations of embodiments of the method or process for providing a personalized user experience in a tax return preparation system based on predicted life events for a user. Those of skill in the art will readily recognize that other implementations and embodiments are possible. Therefore the discussion above should not be construed as a limitation on the claims provided below.

By applying analytics models to user data in a tax return preparation system to provide a personalized user experience based on predicted life events for a user, implementation of embodiments of the present disclosure allows for significant improvement to the fields of user experience, electronic tax return preparation, data collection, and data processing, according to one embodiment. As one illustrative example, by skipping or postponing one or more of the tax questions that otherwise extend the tax return preparation interview (without financial gain to the user), embodiments of the present disclosure allows for progressing a user through a tax return preparation session with fewer processing cycles and less communications bandwidth. As another example, when users see that the tax return preparation system has the capability to address life events that occurred in the user's life, the user is more likely to feel comfortable proceeding to prepare their tax return on their own with the assistance of the tax return preparation system. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition to improving overall computing performance, by using analytics models (e.g., predictive models) to select relevant user experience options for a user, implementation of embodiments of the present disclosure represent a significant improvement to the field of providing an efficient user experience and, in particular, efficient use of human and non-human resources. As one illustrative example, by reducing the number of irrelevant questions provided to a user of a tax return preparation system, the user can devote less time and energy to preparing his/her taxes. Additionally, by showing the user that the tax return preparation system can handle the life events that are likely to have occurred for the user, the tax return preparation system maintains, improves, and/or increases the likelihood that a potential customer will convert into a paying customer because the potential customer is receiving confirmation that the tax return preparation system appears to understand the particular user's tax situation, according to one embodiment. Consequently, using embodiments of the present disclosure, the user experience is less burdensome and time consuming and allows the user to dedicate more of his or her time to other activities or endeavors, while having confidence that the tax return preparation system is adequately addressing tax-related issues that are pertinent to the user.

In accordance with an embodiment, a computing system implemented method provides a personalized user experience in a tax return preparation system based on likelihoods of occurrences of life events for a user. The method includes providing, with one or more computing systems, tax return preparation system data representing a tax return preparation system, according to one embodiment. The method includes receiving, with the one or more computing systems, user data that is associated with a user, according to one embodiment. The method includes storing the user data in one or more sections of memory allocated for use by tax return preparation system, according to one embodiment. The method includes providing predictive model data representing a predictive model, according to one embodiment. The method includes applying the user data to the predictive model data to cause the predictive model data to transform the user data into life event score data representing one or more life event scores to determine that represent a likelihood that one or more available life events occurred for the user in a tax year, prior to requesting an indication from the user of which of the one or more available life events occurred for the user in the tax year, according to one embodiment. The method includes maintaining a user experience options database of life event representations data, the life event representations data representing one or more life event representations that correspond with the one or more available life events, according to one embodiment. The method includes generating user experience display data representing a user experience display with at least some of the life event representations data of the user experience options database, to include at least some of the one or more life event representations in the user experience display, according to one embodiment. The method includes providing the user experience display data representing a the user experience display to the user that to displays at least some of the one or more life event representations that correspond to at least some of the one or more available life events, according to one embodiment. The life event score data is sorted so that the one or more life event representations are displayed in the user experience display in descending order of the likelihood that the one or more available life events occurred for the user in the tax year, to improve a likelihood that a user uses the tax return preparation system to prepare a tax return for the user, with a tax return preparation interview, even if the user experienced one or more of the life events in the tax year, according to one embodiment.

In accordance with an embodiment, a system provides a personalized user experience in a tax return preparation system based on likelihoods of occurrences of life events for a user. The system includes at least one processor and at least one memory coupled to the at least one processor, according to one embodiment. The at least one memory stores instructions which, when executed by any set of the one or more processors, perform a process for providing a personalized user experience in a tax return preparation system based on likelihoods of occurrences of life events for a user, according to one embodiment. The process includes providing a tax return preparation system, according to one embodiment. The process includes receiving user data that is associated with a user, according to one embodiment. The process includes storing the user data in one or more sections of memory allocated for use by tax return preparation system according to one embodiment. The process includes providing a predictive model, according to one embodiment. The process includes applying the user data to the predictive model to cause the predictive model to determine a likelihood that one or more available life events occurred for the user in a tax year, prior to requesting an indication from the user of which of the one or more available life events occurred for the user in the tax year, according to one embodiment. The process includes providing a user experience display to the user that displays one or more life event representations that correspond to the one or more available life events, according to one embodiment. The one or more life event representations are displayed in the user experience display in descending order of the likelihood that the one or more available life events occurred for the user in the tax year, to improve a likelihood that a user use the tax return preparation system to prepare a tax return for the user, with a tax return preparation interview, even if the user experienced one or more of the life events in the tax year, according to one embodiment.

In accordance with an embodiment, a non-transitory computer readable medium includes instructions, which when executed by one or more processors, perform a method for providing a personalized user experience in a tax return preparation system based on likelihoods of occurrences of life events for a user. The instructions include a tax return preparation engine of a tax return preparation system, the tax return preparation engine being configured to receive user data from one or more sources other than a current user of a tax return preparation system, according to one embodiment. The instructions include an analytics module having one or more predictive models that receive the user data and, in response to receipt of the user data, generates a life event score that is representative of a likelihood that the user experienced one of a number of available life events during a tax year, according to one embodiment. The tax return preparation engine places a life event icon in a life events user interface to increase or decrease visibility of the life event icon at least partially based on a value of the life event score that is representative of the likelihood that the user experienced one of a number of available life events during the tax year, to increase a likelihood that a user will rely on service provided by the tax return preparation system.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing a personalized user experience in a tax return preparation system based on likelihoods of occurrences of life events for a user, comprising:
   providing, with one or more computing systems, tax return preparation system data representing a tax return preparation system;
   receiving, with the one or more computing systems, user data that is associated with a user;
   storing the user data in one or more sections of memory allocated for use by tax return preparation system;
   providing predictive model data representing a predictive model;
   applying the user data to the predictive model data to cause the predictive model data to transform the user data into life event score data representing one or more life event scores that represent a likelihood that one or more available life events occurred for the user in a tax year, prior to requesting an indication from the user of which of the one or more available life events occurred for the user in the tax year;

maintaining a user experience options database of life event representations data, the life event representations data representing one or more life event representations that correspond with the one or more available life events;

generating user experience display data representing a user experience display with at least some of the life event representations data of the user experience options database, to include at least some of the one or more life event representations in the user experience display; and providing the user experience display data representing the user experience display to the user to display at least some of the one or more life event representations that correspond to at least some of the one or more available life events, wherein the life event score data is sorted so that the one or more life event representations are displayed in the user experience display in descending order of the likelihood that the one or more available life events occurred for the user in the tax year, to improve a likelihood that a user uses the tax return preparation system to prepare a tax return for the user, with a tax return preparation interview, even if the user experienced one or more of the life events in the tax year.

2. The computing system implemented method of claim 1, wherein the life event representations data are selected from a group of life event representations data consisting of:
data representing life event icons;
data representing life event bubbles;
data representing life event avatars; and
data representing life event tiles.

3. The computing system implemented method of claim 1, wherein the life event representations data represent the one or more life event representations that are user interface input elements that receive selection input from the user.

4. The computing system implemented method of claim 1, wherein the life event representations data are displayed in the user experience display in a life events user interface, wherein the life event representations data is rendered in the life events user interface so that the one or more life event representations are displayed in rows and columns, wherein the one or more life event representations are displayed in the life events user interface from a top of the life events user interface to a bottom of the life events user interface in descending order of the likelihood that the one or more available life events occurred for the user in the tax year.

5. The computing system implemented method of claim 1, wherein the life event representations data are displayed in the user experience display in a life events user interface, wherein the life event representations data is rendered in the life events user interface so that those of the one or more available life events having a higher likelihood of occurrence for the user in the tax year have life event representations that are located nearer a top of the life events user interface than those of the one or more available life events having a lower likelihood of occurrence for the user in the tax year, to increase visibility to the user of life event representations that are more likely to have occurred for the user in the tax year.

6. The computing system implemented method of claim 1, further comprising:
receiving selections data representing selections of the one or more life event representations, from the user, to confirm which of the one or more life event representations represent life events that have occurred for the user in the tax year; and based on the selections data representing the selections of the one or more life event representations, integrating interview content data into the user experience display, to further tailor the tax return preparation interview to life events that have occurred for the user in the tax year.

7. The computing system implemented method of claim 1, further comprising:
determining confidence level data representing a level of confidence in the life event score data, at least partially based on a source of the user data; and
at least partially based on the life event score data and the confidence level data, selecting interview content data to include in the user experience display data to personalize the user experience display and the tax return preparation interview for the user.

8. The computing system implemented method of claim 7, wherein the interview content data represents interview content, wherein the interview content includes one or more of: types of tax-related questions, a sequence of tax-related questions, types of tax topics, sequences of presentation of tax topics, and menu styles.

9. The computing system implemented method of claim 1, further comprising:
acquiring additional user data during the tax return preparation interview;
applying the additional user data to the predictive model data to transform the additional user data into additional life event score data representing additional life event scores that represent likelihoods that one or more available life events will occur in a current tax year for the user; and
providing marketing message data representing one or more marketing messages to the user indicating that the tax return preparation system includes a capability of accounting for those of the one or more available life events that are likely to occur for the user in the current tax year.

10. The computing system implemented method of claim 1, wherein the user data is selected from a group of user data consisting of:
data indicating an age of the user;
data indicating an age of a spouse of the user;
data indicating a zip code;
data indicating a tax return filing status;
data indicating state income;
data indicating a home ownership status;
data indicating a home rental status;
data indicating a retirement status;
data indicating a student status;
data indicating an occupation of the user;
data indicating an occupation of a spouse of the user;
data indicating whether the user is claimed as a dependent;
data indicating whether a spouse of the user is claimed as a dependent;
data indicating whether another taxpayer is capable of claiming the user as a dependent;
data indicating whether a spouse of the user is capable of being claimed as a dependent;
data indicating salary and wages;
data indicating taxable interest income;
data indicating ordinary dividend income;
data indicating qualified dividend income;

data indicating business income;
data indicating farm income;
data indicating capital gains income;
data indicating taxable pension income;
data indicating pension income amount;
data indicating IRA distributions;
data indicating unemployment compensation;
data indicating taxable IRA;
data indicating taxable Social Security income;
data indicating amount of Social Security income;
data indicating amount of local state taxes paid;
data indicating whether the user filed a previous years' federal itemized deduction;
data indicating whether the user filed a previous years' state itemized deduction; and
data indicating whether the user is a returning user to the tax return preparation system;
data indicating an annual income;
data indicating an employer's address;
data indicating contractor income;
data indicating a marital status;
data indicating a medical history;
data indicating dependents;
data indicating assets;
data indicating spousal information;
data indicating children's information;
data indicating an address;
data indicating a name;
data indicating a Social Security Number;
data indicating a government identification;
data indicating a date of birth;
data indicating educator expenses;
data indicating health savings account deductions;
data indicating moving expenses;
data indicating IRA deductions;
data indicating student loan interest deductions;
data indicating tuition and fees;
data indicating medical and dental expenses;
data indicating state and local taxes;
data indicating real estate taxes;
data indicating personal property tax;
data indicating mortgage interest;
data indicating charitable contributions;
data indicating casualty and theft losses;
data indicating unreimbursed employee expenses;
data indicating an alternative minimum tax;
data indicating a foreign tax credit;
data indicating education tax credits;
data indicating retirement savings contributions; and
data indicating child tax credits.

11. A system for providing a personalized user experience in a tax return preparation system based on likelihoods of occurrences of life events for a user, the system comprising:
   at least one processor; and
   at least one memory coupled to the at least one processor, the at least one memory having stored therein instructions which, when executed by any set of the one or more processors, perform a process for providing a personalized user experience in a tax return preparation system based on likelihoods of occurrences of life events for a user, the process including:
      providing tax return preparation system data representing a tax return preparation system;
      receiving, with the one or more computing systems, user data that is associated with a user;
      storing the user data in one or more sections of memory allocated for use by tax return preparation system;
      providing predictive model data representing a predictive model;
      applying the user data to the predictive model data to cause the predictive model data to transform the user data into life event score data representing one or more life event scores that represent a likelihood that one or more available life events occurred for the user in a tax year, prior to requesting an indication from the user of which of the one or more available life events occurred for the user in the tax year;
      maintaining a user experience options database of life event representations data, the life event representations data representing one or more life event representations that correspond with the one or more available life events;
      generating user experience display data representing a user experience display with at least some of the life event representations data of the user experience options database, to include at least some of the one or more life event representations in the user experience display; and
      providing the user experience display data representing the user experience display to the user to display at least some of the one or more life event representations that correspond to at least some of the one or more available life events,
      wherein the life event score data is sorted so that the one or more life event representations are displayed in the user experience display in descending order of the likelihood that the one or more available life events occurred for the user in the tax year, to improve a likelihood that a user uses the tax return preparation system to prepare a tax return for the user, with a tax return preparation interview, even if the user experienced one or more of the life events in the tax year.

12. The system of claim 11, wherein the life event representations data are selected from a group of life event representations data consisting of:
   data representing life event icons;
   data representing life event bubbles;
   data representing life event avatars; and
   data representing life event tiles.

13. The system of claim 11, wherein the life event representations data represent the one or more life event representations that are user interface input elements that receive selection input from the user.

14. The system of claim 11, wherein the life event representations data are displayed in the user experience display in a life events user interface, wherein the life event representations data is rendered in the life events user interface so that the one or more life event representations are displayed in rows and columns, wherein the one or more life event representations are displayed in the life events user interface from a top of the life events user interface to a bottom of the life events user interface in descending order of the likelihood that the one or more available life events occurred for the user in the tax year.

15. The system of claim 11, wherein the life event representations data are displayed in the user experience display in a life events user interface, wherein the life event representations data is rendered in the life events user interface so that those of the one or more available life events having a higher likelihood of occurrence for the user in the tax year have life event representations that are located nearer a top of the life events user interface than those of the one or more available life events having a lower likelihood of occurrence for the user in the tax year, to increase visibility to the user of life event representations that are more likely to have occurred for the user in the tax year.

16. The system of claim 11, wherein the process further comprises:
receiving selections data representing selections of the one or more life event representations, from the user, to confirm which of the one or more life event representations represent life events that have occurred for the user in the tax year; and
based on the selections data representing the selections of the one or more life event representations, integrating interview content data into the user experience display, to further tailor the tax return preparation interview to life events that have occurred for the user in the tax year.

17. The system of claim 11, wherein the process further comprises:
determining confidence level data representing a level of confidence in the life event score data, at least partially based on a source of the user data; and
at least partially based on the life event score data and the confidence level data, selecting interview content data to include in the user experience display data to personalize the user experience display and the tax return preparation interview for the user.

18. The system of claim 17, wherein the interview content data represents interview content, wherein the interview content includes one or more of: types of tax-related questions, a sequence of tax-related questions, types of tax topics, sequences of presentation of tax topics, and menu styles.

19. The system of claim 11, further comprising:
acquiring additional user data during the tax return preparation interview;
applying the additional user data to the predictive model data to transform the additional user data into additional life event score data representing additional life event scores that represent likelihoods that one or more available life events will occur in a current tax year for the user; and
providing marketing message data representing one or more marketing messages to the user indicating that the tax return preparation system includes a capability of accounting for those of the one or more available life events that are likely to occur for the user in the current tax year.

* * * * *